United States Patent [19]
Sato

[11] Patent Number: 5,598,428
[45] Date of Patent: Jan. 28, 1997

[54] DS/CDMA DIVERSITY RECEIVER WITH DESPREADING FILTERS USING COMBINER WHEREIN FIRST AND SECOND DESPREADING FILTERS ARE DELAYED WITH RESPECT TO EACH OTHER BY A PERIOD OF HALF THE CHIP RATE

[75] Inventor: Toshifumi Sato, Tokyo, Japan

[73] Assignee: NEC Corporation, Tokyo, Japan

[21] Appl. No.: 356,952

[22] Filed: Dec. 16, 1994

[30] Foreign Application Priority Data

Dec. 16, 1993 [JP] Japan ................... 5-316173

[51] Int. Cl.$^6$ ............... H04K 1/00; H04B 15/00
[52] U.S. Cl. ............... 375/206; 375/347; 380/9; 380/42; 370/342
[58] Field of Search ................... 375/206, 205, 375/200, 267, 234, 347; 370/18; 380/9, 42, 44, 33

[56] References Cited

U.S. PATENT DOCUMENTS

| | | | |
|---|---|---|---|
| 4,189,733 | 2/1980 | Malm | 342/368 |
| 4,608,701 | 8/1986 | Burgers et al. | 375/200 |
| 5,031,195 | 7/1991 | Chevillat | 375/234 |
| 5,109,390 | 4/1992 | Gilhousen et al. | 375/205 |
| 5,193,102 | 3/1993 | Meidan et al. | 375/242 |
| 5,343,496 | 8/1994 | Honig et al. | 375/205 |
| 5,377,266 | 12/1994 | Davis | 375/205 |
| 5,414,699 | 5/1995 | Lee | 375/206 |

FOREIGN PATENT DOCUMENTS 4-185130  7/1992  Japan.

Primary Examiner—Wellington Chin
Assistant Examiner—William Luther
Attorney, Agent, or Firm—Foley & Lardner

[57] ABSTRACT

A DS/CDMA receiver includes first and second diversity branches each including an antenna, a receiver and a despreading filter. The output signals of the transversal despreading filters of both diversity branches are diversity-combined, and threshold decision is made on the combined signal to produce a decision output. A decision error is detected from the combined signal and the decision output. Interchannel interference is canceled in each despreading filter by controlling their tap weights so that the tap weight coefficient vectors of each filter are orthogonal to all the spread codes of signals from other sources and multipath fading related intersymbol interference is canceled when the decision error of the diversity-combined signal is reduced to a minimum.

9 Claims, 3 Drawing Sheets

TAP WEIGHT CONTROLLER 6

LEGEND:

$\mathbf{u} = \begin{pmatrix} u_1 \\ u_2 \end{pmatrix}$ : 12M-DIMENSIONAL VECTOR $\mathbf{a} = \begin{pmatrix} a_1 \\ a_2 \end{pmatrix}$ : 12M-DIMENSIONAL VECTOR $\mathbf{k}$ :   12M-DIMENSIONAL VECTOR $P$ :   12M x 12M MATRIX

DS/CDMA DIVERSITY RECEIVER WITH DESPREADING FILTERS USING COMBINER WHEREIN FIRST AND SECOND DESPREADING FILTERS ARE DELAYED WITH RESPECT TO EACH OTHER BY A PERIOD OF HALF THE CHIP RATE

BACKGROUND OF THE INVENTION

1. Field of the Invention

The present invention relates generally to spread spectrum communications systems, and more particularly to an intersymbol interference canceling technique for a direct sequence code division multiple access (DS/CDMA) receiver.

2. Description of the Related Art

Commercial interest in DS/CDMA communication systems has recently risen due to their potential ability to provide service to more users than is offered by other multiple access techniques. In the DS/CDMA system, each mobile station includes a channel encoder and a multiplier for multiplying the output of the encoder with a distinct spread code. The output of the multiplier is modulated onto a carrier for transmission. Signals from mobile stations are code division multiplexed with other mobile-transmitted signals within the same frequency spectrum, so that the signal at the input of each DS/CDMA cell-site receiver is a sum of the signals from the mobile stations. Each cell-site receiver multiplies a received bit sequence with a distinct spread code, which may be preassigned or assigned on an as-needed basis, so that signals from undesired mobile stations are "spread" over the frequency spectrum of the system and become noise, while the components of the desired signal are "despread" into a signal having a significant amplitude. The noise resulting from the spreading of undesired signals may be insignificant if the number of mobile stations is small. However, the noise level will affect the desired signal if the number of mobile stations increases.

While the DS/CDMA system allows the use of a simple RAKE receiver to obtain the benefit of the path diversity technique, it is impossible to reduce interchannel interference to zero. Therefore, a precision power control technique is required to control the transmission power of uplink signals from mobile station. Multipath fading related intersymbol interference is another problem for the CS/CDMA cellular communications system.

Japanese Provisional Patent Publication Hei-4-185130 discloses a diversity receiver for spread spectrum communications systems in which a plurality of antenna branches and a delay circuit are used to reduce multipath fading related intersymbol interference which arises when the difference between the arrival times of the multipath signals are less than two chip intervals. However, if the multipath time difference is an integral multiple of the symbol interval, it is impossible to cancel the multipath fading related intersymbol interference since they are spread with the same spreading sequence.

SUMMARY OF THE INVENTION

It is therefore an object of the present invention to provide a DS/CDMA diversity receiver capable of canceling interchannel interference and multipath fading related intersymbol interference.

According to the present invention, there is provided a direct-sequence code division multiple access receiver which comprises first and second diversity branches. The first diversity branch includes a first antenna, a first receiver connected thereto and a first despreading filter comprising a tapped delay line for successively delaying an output signal of the first receiver, a plurality of multipliers for weighting tap signals on successive taps of the tapped delay line with a first vector of tap weight coefficients and an adder for summing the weighted tap signals to produce an output signal of the first despreading filter. Similarly, the second diversity branch includes a second antenna, a second receiver connected thereto and a second despreading filter comprising a tapped delay line for successively delaying an output signal of the second receiver, a plurality of multipliers for weighting tap signals on successive taps of the tapped delay line with a second vector of tap weight coefficients and an adder for summing the weighted tap signals to produce an output signal of the second despreading filter. The output signals of the first and second despreading filters are diversity-combined to produce a combined signal. A decision circuit makes a threshold decision on the combined signal to produce a decision output signal. A decision error is detected from the combined signals and the decision output signal. A tap weight controller controls the first and second vectors of tap weight coefficients with the tap signals of the first and second despreading filters and the decision error so that the decision error is reduced to a minimum.

Interchannel interference is canceled in each of the despreading filters by controlling the first and second vectors so that they are orthogonal to all the spread codes of signals from other sources and multipath fading related intersymbol interference is canceled when the decision error of the diversity-combined signal is minimized.

BRIEF DESCRIPTION OF THE DRAWINGS

The present invention will be described in further detail with reference to the accompanying drawings, in which.

DETAILED DESCRIPTION

Figure 1:
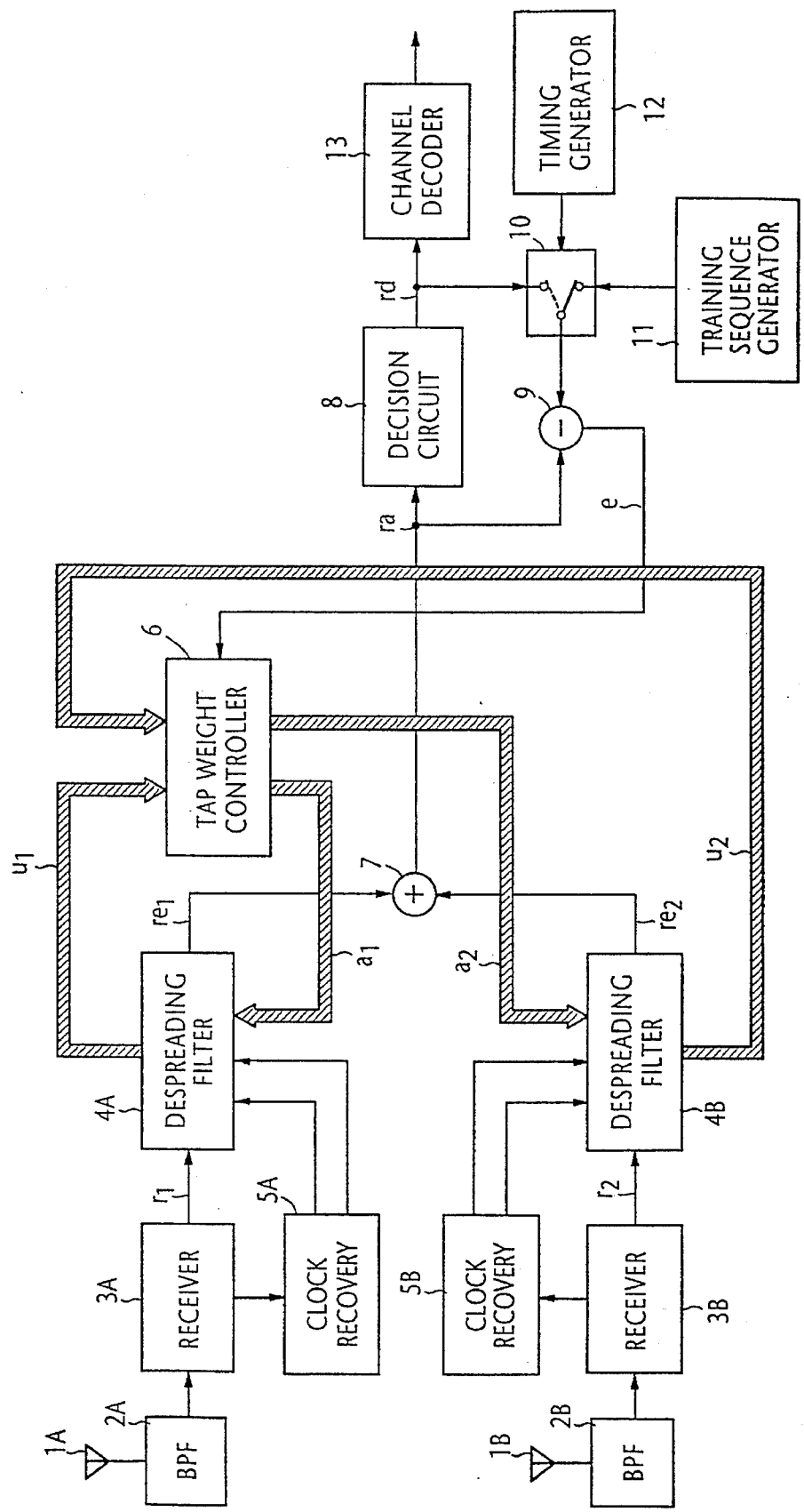
FIG. 1 is a block diagram of a receiver at a cell-site station of a DS/CDMA (direct-sequence code division multiple access) cellular communication system according to the present invention.

Referring now to FIG. 1, there is shown a receiver of the present invention at a cell-site station for a DS/CDMA (direct-sequence code division multiple access) communication system. At the cell-site station, the DS/CDMA receiver for each mobile user comprises first and second diversity branches of identical configuration. The first diversity branch includes a diversity antenna 1A for receiving a delay-dispersed, spread spectrum signal through a multipath fading channel from the mobile user station, and a bandpass filter 2A for band-limiting the signal to the frequency spectrum of the CDMA communication system. A receiver 3A, connected to the bandpass filter 2A, has radio frequency, intermediate frequency and demodulation stages to produce a baseband output signal $r_1$. A despreading filter 4A, which is a finite impulse response (FIR) filter, is connected to the receiver 3A to despread the signal $r_1$ with a vector $a_1$ of tap weight coefficients from a tap weight controller 6 to produce an output signal $re_1$. A clock recovery circuit 5A is provided to recover clock pulses at the chip- and symbol rates of the transmitted signal and produces a first clock twice the transmitted chip-rate and a second clock equal to the transmitted symbol rate. Despreading filter 4A uses these recovered clock pulses for despreading the input signal $r_1$.

In the same manner, the second diversity branch includes a diversity antenna 1B for receiving a delay-dispersed, spread spectrum signal through another multipath fading channel from the same mobile user station. Bandpass filter 2B limits the signal to the system's frequency spectrum and receiver 3B produces a baseband output signal $r_2$. Despreading filter 4B produces an output signal $re_2$ by despreading the baseband signal $r_2$ using a sequence $a_2$ of tap weight coefficients produced by the tap weight controller 6. Clock recovery circuit 5B recovers the necessary clock pulses for despreading filter 4B from the signal obtained during the demodulation process of the receiver 3B. Antennas 1A and 1B are spaced apart approximately ten times the wavelength of the received carrier, typically at least 1.5 meters for a carrier frequency of 2 $CH_2$.

In each of the despreading filters 4A and 4B, the tap weight coefficients are adaptively controlled so that their vectors are orthogonal to all the spread codes except for one used at the mobile station of interest. Due to this orthogonality, multiple-access interchannel interference is canceled.

The output signals $re_1$ and $re_2$ of the filters are diversity-combined by an adder 7 to produce a sum "ra", the output of which is applied to a decision circuit 8 where it is compared with a predetermined threshold to produce a decision output "rd". The decision output "rd" is applied to a channel decoder 13 where it is decoded in a process inverse to that of the channel encoder at the mobile station transmitter.

A switch 10 has a first terminal connected to the output of decision circuit 8 and a second terminal connected to a training sequence generator 11 which produces a training sequence which is known by both the cell site receiver and the corresponding mobile user. Between the output terminal of switch 10 and the input of decision circuit 8 is provided a subtractor 9 to produce a difference signal between signals "ra" and "rd".

The moving contact of switch 10 is initially connected to the second terminal when a CDMA burst is received from the mobile transmitter. The decision error "e" during the initial period of the burst represents the difference between the incoming and training sequences of the same code pattern. The output of substractor 9 is applied to the tap weight controller 6 as a feedback correction signal to adaptively update the tap weights of despreading filters 4A, 4B so that the decision error reduces to a minimum. When this occurs, the tap weight coefficients are said to be converged to the same spread sequence as that used at the mobile station. Upon termination of the training sequence, the timing generator 12 commands the switch 10 to connect the output of decision circuit 8 to the substractor 9 for tracking the transmitter's sequence under the varying characteristics of the transmission medium using a decision error that is derived from the difference between the input and output of decision circuit 8.

The difference between the signals "ra" and "rd" represents the decision error "e" which arises from a number of factors including interchannel interference caused by uplink signals transmitted from other mobile stations using other spreading codes, multipath-fading related intersymbol interference, and receiver noise. Since each of the despreading filters 4A, 4B has the ability to cancel such interchannel interference, the error factors that must be taken into consideration are the multipath-fading related intersymbol interference and receiver noise.

If a signal from a mobile station is propagated over multipath fading channels and the difference between the arrival times of the multipath signals (multipath time difference) is an integral multiple of the symbol interval, it is impossible to cancel intersymbol interference if use is made of only one despreading filter due to the fact that the multipath signals are both spread at the mobile transmitter by the same spreading sequence. Hence, the spreading sequence of each multipath signal fully overlaps with that of the other multipath signal and cannot be discriminated from it. However, due to the use of two diversity branches, the respective input signals to the despreading filters 4A and 4B advantageously differ in terms of their amplitudes and phases, and their multipath time differences are of the same value. As a result, the CDMA diversity receiver of the present invention has the ability to cancel such interference factors by diversity combining the outputs of the despreading filters, even if the multipath time difference is an integral multiple of the symbol interval Ts.

A mathematical analysis is given for a simplified, but practical model in which it is assumed that the receiver noise is negligible. Let s(t) denote a transmitted DS/CDMA signal and $\tau$ the time difference between the early arriving signal (direct wave) and the later arriving signal (reflected wave) at each antenna, and let $g_{ij}$ denote the amplitude/phase characteristics of the singles, where i=1 and i=2 represent the outputs of antennas 1A and 1B, respectively, and j=1 and i=2 represent the early arriving signal and later arriving signal, respectively. Since the interchannel interference is canceled by each of the despreading filters 4A, 4B due to the orthogonality of their tap weight coefficient vectors to the spread codes of undesired signals, their output signals $re_1(t)$ and $re_2(t)$ for multipath fading channels are given in the form:

$$re_1(t) = g_{11} \times s(t) + g_{12} \times s(t-\tau) \qquad (1)$$

$$re_2(t) = g_{21} \times s(t) + g_{22} \times s(t-\tau) \qquad (2)$$

Solving Equations (1) and (2) for s(t) gives:

$$g_{22} re_1(t) - g_{12} re_2(t) = g_{22} g_{11} \times s(t) - g_{12} g_{21} \times s(t) \qquad (3)$$

By representing the left-hand terms of Equation (3) as, $$re_1'(t) = g_{22} \times re_1(t) \qquad (4)$$

$$re_2'(t) = -g_{12} \times re_2(t) \qquad (5)$$

the output signal ra(t) of diversity combiner 7 is given by Equation (6) as follows:

$$\begin{aligned} ra(t) &= re_1'(t) + re_2'(t) \qquad (6) \\ &= (g_{11} \times g_{22} - g_{21} \times g_{12}) s(t) \end{aligned}$$

If the tap weight coefficient vectors $a_1$ and $a_2$ are controlled to minimize the decision error Equation (6) will be satisfied, canceling the intersymbol interference $s(t-\tau)$.

Additionally, the DS/CDMA receiver of the present invention has the ability to compensate for interference for a complex model in which the interchannel interference is not completely canceled by each despreading filter by adaptively controlling the tap weight coefficient vectors $a_1$ and $a_2$ to reduce the decision error to a minimum.

Figure 2:
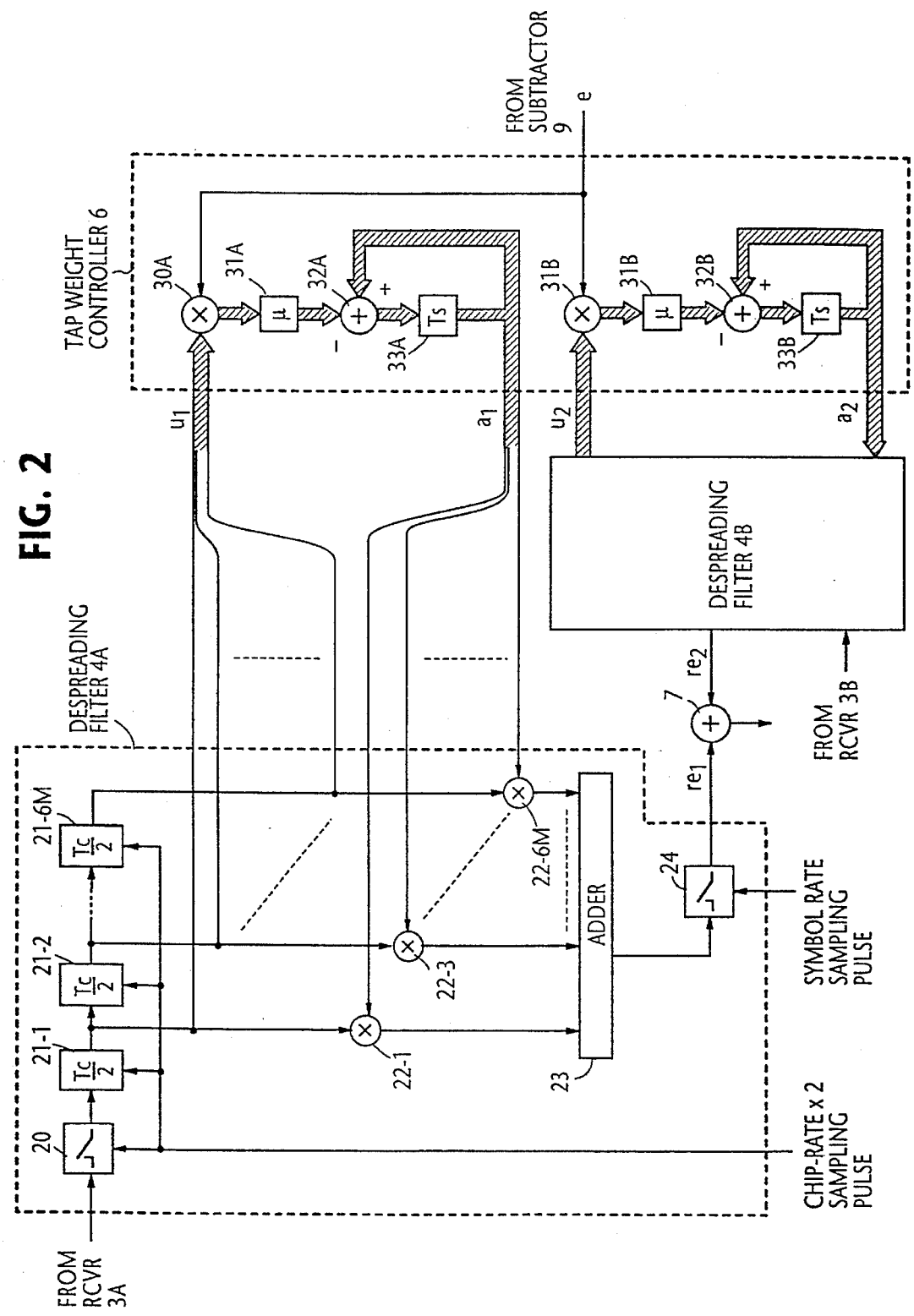
FIG. 2 is a block diagram showing details of a despreading filter and a tap weight controller using the LMS algorithm.

Details of the despreading filters and the tap weight controller are shown in FIG. 2. As illustrated, the despreading filter 4A has a sampling gate 20 for sampling the output of receiver 3A at twice the chip rate of the recovered clock and a tapped delay-line implemented with a shift register, or a series of 6×M delay-line elements 21-1 through 21-6M of delay time Tc/2 (wherein M is the spreading factor of the DS/CDMA signal, i.e., the number of chips used to spread each symbol at a chip rate, and Tc is the reciprocal of the chip rate). Tap signals on the successive taps of the delay line of despreading filter 4A are supplied to the tap weight controller as a "delay-line" vector $u_1$ on the one hand and supplied to multipliers 22-1 to 22-6M, respectively, where they are weighted by tap weight coefficients which supplied as a "tap-weight" vector $a_1$ from tap weight controller 6. The weighted tap signals are summed by an adder 23, whose output is fed to a sampling gate 24 where it is sampled at the symbol-rate clock to produce an output signal $re_1$.

For adaptively updating the tap weights, tap weight controller 6 may use the LMS (least-mean-squares) algorithm which is characterized by simple, but slow convergence speed, or the RLS (recursive-least-squares) algorithm which is characterized by complex, but fast convergence speed. If the LMS algorithm is employed, the tap weight controller 6 includes a vector multiplier 30A which multiplies the delay-line vector $u_1$ with the decision error e. The output of vector multiplier 30A is scaled with an update coefficient $\mu$ by a scaler 31A to produce a vector $\mu \cdot e \cdot u_1$ which is fed to a vector subtractor 32A where it is substrated from the output vector of a symbol delay circuit 33A which introduces a symbol time delay Ts to the output of subtractor 32A. The output of symbol delay circuit 33A is the tap weight vector $a_1$ whose tap weight coefficients are respectively applied to the multipliers of despreading filter 4A. In like manner, the delay-line vector $u_2$ is multiplied by vector multiplier 30B with the decision error and is scaled at scaler 31B with the update coefficient $\mu$ to produce a vector $\mu \cdot e \cdot u_2$ which is fed to vector subtractor 32B where it is subtracted from the output vector of symbol delay circuit 33B. The output of symbol delay circuit 33B is the tap weight vector $a_2$ whose tap weight coefficients are respectively applied to the multipliers of despreading filter 4B.

Figure 3:
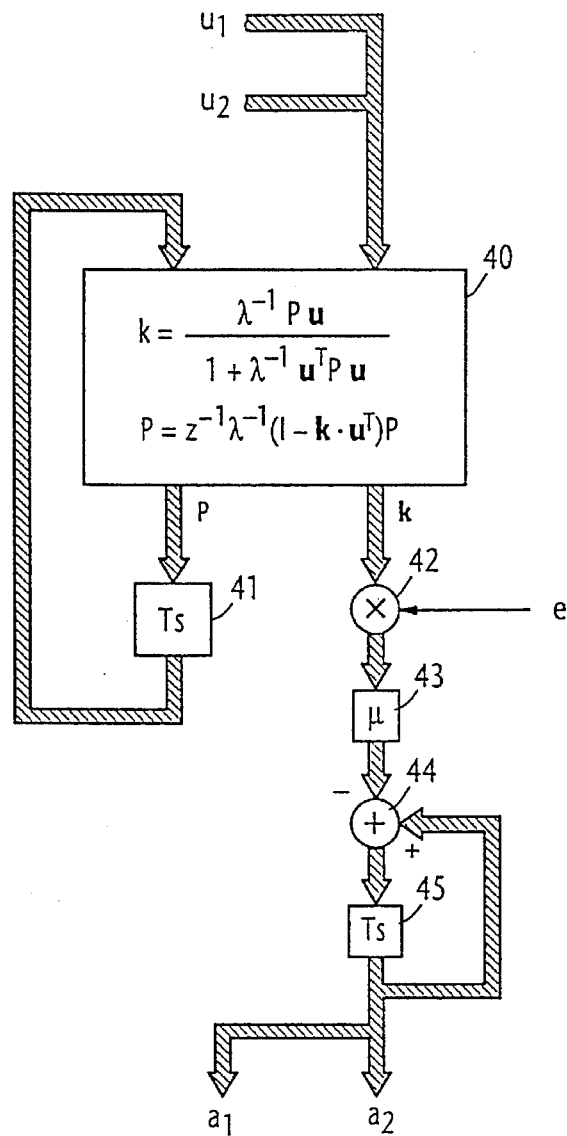
FIG. 3 is a block diagram of a tap weight controller using the RLS algorithm.

If the RLS algorithm is used for tap weight control, the controller 6 is formed, as shown in FIG. 3, with a calculator 40 which calculates the vectors $u_1$ and $u_2$ from the despreading filters 4A, 4B according to the well-known RLS algorithm to produce a gain vector k, a symbol delay element 41 which delays the 12M×12M matrix P by a symbol interval Ts and feeds it back to the RLS calculator 40, a vector multiplier 42 for multiplying the gain vector k with the decision error "e". The output of multiplier 41 is scaled by the update coefficient $\mu$. The scaled vector is subtracted from the output of a symbol delay element 45 which introduces a symbol delay to the output vector of the subtractor 44 to produce vectors $a_1$ and $a_2$.

What is claimed is:

1. A direct-sequence code division multiple access receiver comprising:

a first diversity branch having a first antenna, a first receiver connected thereto for recovering a transmitted symbol which was spread at a chip rate with a spreading code of predetermined length, and a first despreading filter comprising a tapped delay line having a series of taps for successively delaying a recovered symbol to produce tap signals, a plurality of multipliers for weighting the tap signals with a first vector of tap weight coefficients, and an adder for summing the weighted tap signals to produce an output signal of the first despreading filter;

a second diversity branch having a second antenna, a second receiver connected thereto for recovering a transmitted symbol which was spread at the chip rate with the spreading code, and a second despreading filter comprising a tapped delay line having a series of taps for successively delaying the recovered symbol to produce tap signals, a plurality of multipliers for weighing the tap signals with a second vector of tap weight coefficients, and an adder for summing the weighted tap signals to produce an output signal of the second despreading filter;

the tap signals of the first and second despreading filters being delayed with respect to each other by a period equal to half the reciprocal of the chip rate and the number of the taps of the delay lines of the first and second despreading filters defining a length which equals an integral multiple of the length of the spreading code;

a diversity combiner for combining the output signals of said first and second despreading filters to produce a combined signal;

a decision circuit for making a threshold decision based on said combined signal to produce a decision output signal;

means for detecting a decision error from said combined signal and said decision output signal; and control means for controlling said first and second vectors of tap weight coefficients with the tap signals of said first and second despreading filters and said decision error so that the decision error is reduced to a minimum.

2. A direct-sequence code division multiple access receiver as claimed in claim 1, wherein said first and second vectors are controlled so that said vectors are orthogonal to spread codes of signals other than a spread code of a desired signal.

3. A direct-sequence code division multiple access receiver as claimed in claim 1, wherein said control means includes means for controlling said first and second vectors in accordance with a least-mean-squares algorithm.

4. A direct-sequence code division multiple access receiver as claimed in claim 1, wherein said control means includes means for controlling said first and second vectors in accordance with a recursive-least-squares algorithm.

5. A direct-sequence code division multiple access receiver as claimed in claim 1, wherein the integral multiple is equal to 6.

6. A direct-sequence code division multiple access receiver as claimed in claim 1, wherein the first despreading filter further comprises means for sampling the recovered symbol at twice the chip rate and coupling the sampled symbol to the tapped delay line of the first despreading filter, and the second despreading filter further comprises means for sampling the recovered symbol at twice the chip rate and coulping the sampled symbol to the tapped delay line of the second despreading filter.

7. A direct-sequence code division multiple access receiver as claimed in claim 6, wherein the first despreading filter further comprises means for sampling the output signal of the first despreading filter at the rate of the transmitted symbol, and the second despreading filter further comprises means for sampling the output signal of the second despreading filter at the rate of the transmitted symbol.

8. A direct-sequence code division multiple access receiver as claimed in claim 5, wherein the first despreading filter further comprises means for sampling the recovered symbol at twice the chip rate and coupling the sampled symbol to the tapped delay line of the first despreading filter, and the second despreading filter further comprises means for sampling the recovered symbol at twice the chip rate and coupling the sampled symbol to the tapped delay line of the second despreading filter.

9. A direct-sequence code division multiple access receiver as claimed in claim 8, wherein the first despreading filter further comprises means for sampling the output signal of the first despreading filter at the rate of the transmitted symbol, and the second despreading filter further comprises means for sampling the output signal of the second despreading filter at the rate of the transmitted symbol.

* * * * *